A. T. Wright.
Honey Comb Frame.
N° 38,925.          Patented Jun. 16, 1863.
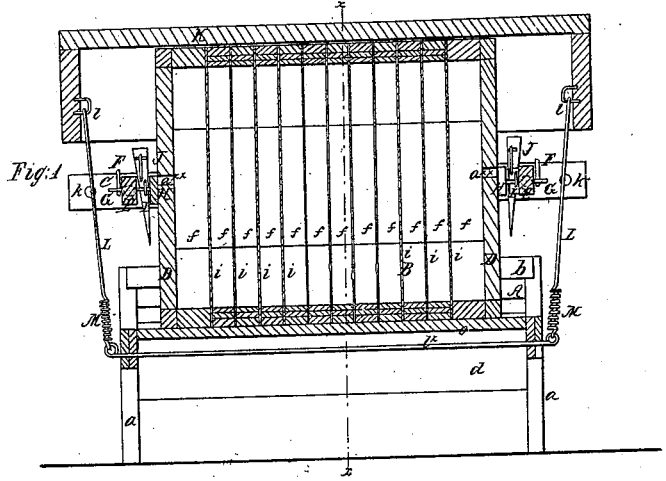
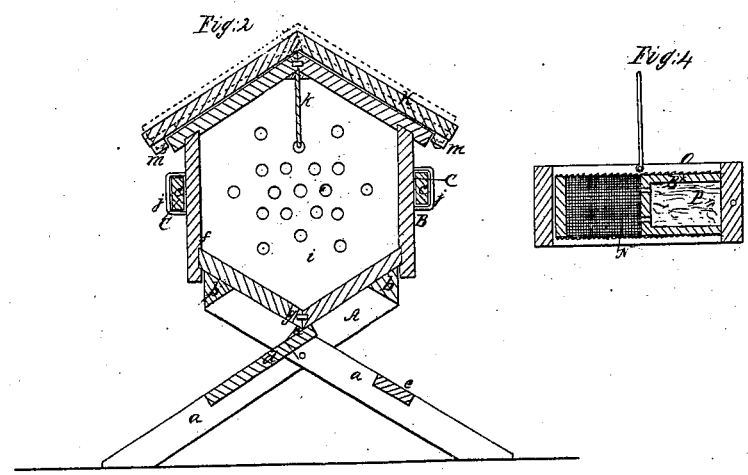
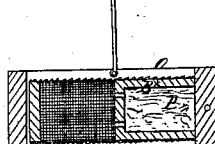
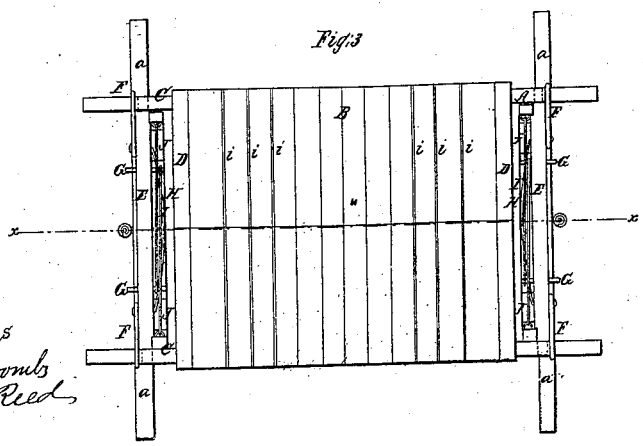
Witnesses
J. W. Coombs
G. W. Reed
Inventor
A. T. Wright
per Munn & Co
Attorneys
N. PETERS, PHOTO-LITHOGRAPHER, WASHINGTON, D. C.

UNITED STATES PATENT OFFICE.

A. T. WRIGHT, OF OSKALOOSA, IOWA.

IMPROVEMENT IN BEE-HIVES.

Specification forming part of Letters Patent No. 38,925, dated June 16, 1863.

*To all whom it may concern:*

Be it known that I, A. T. WRIGHT, of Oskaloosa, in the county of Mahaska and State of Iowa, have invented a new and Improved Bee-Hive; and I do hereby declare that the following is a full, clear, and exact description of the same, reference being had to the accompanying drawings, making a part of this specification, in which—

Figure 1 is a side sectional view of my invention, taken in the line $x\,x$, Fig. 3; Fig. 2 a transverse vertical section of the same, taken in the line $y\,y$, Fig. 1; Fig. 3, a plan or top view of the same, with the roof or cover moved; Fig. 4, a view of the queen cage and feeder.

Similar letters of reference indicate corresponding parts in the several figures.

The object of this invention is to obtain a bee-hive which will be better adapted than usual to the habits and instinctive requirements of the bee, and which will afford a convenience in the management of both the bees and the hive with regard to every department of bee-culture.

The invention consists, substantially, in having the hive constructed of a series of sections fitted or placed upon a suitable trestle and secured in proper position by means of clamps, the sections of the hive being provided with a suitable cover or lid and all arranged as hereinafter fully shown and described.

To enable those skilled in the art to fully understand and construct my invention, I will proceed to describe it.

A represents a trestle, which supports the hive. This trestle is constructed of two end pieces formed by two bars, $a\,a$, which cross each other, as shown in Fig. 2, the upper ends of the two end pieces being connected by bars $b\,b$, and also connected by a bar, $c$, at their points of intersection, and by a board, $d$, at one side below the bar $c$, and by a bar, $e$, at the opposite side. This trestle may all be constructed of wood of any suitable dimensions, as may be required.

B represents the hive, which is formed or composed of a series of sections or frames, $f$, the lower parts of which are of V form, so as to fit snugly into the upper part of the trestle. The sides of the frames are vertical and the tops are formed of two inclined pieces, the whole forming a hexagon, which I consider the best shape for practical purposes. The top pieces of the frames project beyond the sides a trifle, and the sides extend down a trifle below the bottom pieces. These projecting ends serve as a convenience for handling the frames, prying them apart, &c., and the lower projections serve to retain the frames in proper position on the trestle.

The frames may be of any desired width, constructed of wood, and provided with an opening or bee-entrance, $g$, at their lower ends at one side, said entrances being just above the board $d$ of the trestle, which is designed to serve as an alighting-board. (See Fig. 2.) Within the frames, when the latter are made sufficiently large to require it, there are placed pendent bars $h$. (See Fig. 2.) These bars support the combs and prevent them from breaking down under their own weight.

The several frames, or any desired number of them, are divided by perforated sheet-metal plates or thin wooden boards $i$, (shown in Figs. 1 and 2,) and the frames are retained in proper position by a clamping device constructed as follows:

C C are two bars placed horizontally, one at each side of the frames $f$, and passing through staples or guides $j$, attached one to each side of hexagon end pieces, D D, which are placed one at each end of the series of frames $f$. These bars C are perforated with holes K, into which the tenons of cross-bars E are fitted loosely, the bars C being secured to the cross-bars E by means of hooks F. (Shown in Figs. 1 and 3.)

G G are two guide-pins, which pass loosely through each of the cross-bars E, and have bars H attached to their ends. These bars H are equal in length to the width of the end pieces, D, and between said bars H and the cross-bars E there are placed springs I, which cause the bars to press against the end pieces, D, and firmly clamp the frames together in close contact. In addition to these springs I, wedges J are used, the same being placed or interposed between the cross-bars $e$ and the bars H. The springs I, in the event of the wedges being used, retain the frames in proper position when the wedges are withdrawn. This clamping device, while holding the frames in proper position on the trestle, admits of any of the frames being readily removed or additional ones being applied to or fitted on the trestle.

The frames $f$ are protected by a cover or roof, K, having a double pitch, as shown in Fig. 2. This roof or cover rests on the top of the frames, and is secured in position by hooks $l$, which are fitted in staples $m$ at the inner sides of the ends of the roofs. The hooks $l$ are formed at the ends of rods L, the lower ends of which are attached one to each end of a rod, $l^\times$, in the trestle A, and have spiral springs M formed on them by bending the rods around a cylinder of suitable diameter. (See Fig. 1.) The springs M bind the trestle, hive, and roof firmly together, and during warm weather the roof may be elevated a short distance above the tops of the frames $f$ to admit of an air-space between by means of buttons $m$, which may be turned down, so as to rest upon the top of the hive. The perforated plates or boards $i$ insure the combs being built straight within the frames, and in order to more fully guard against an irregular building of the combs comb-guides may be employed, the same consisting of strips of bee-comb secured in a straight line to the under surfaces of the tops of the frames.

The frames $f$ are designed—a certain number of them—for brood-combs, and a certain number for spare-honey recepticles, and, as each frame comprises a separate compartment, the queens may be propagated without any trouble or difficulty whatever. The hive also may be enlarged at any time by the adding of the frames either to augment the breeding-divisions of the same or the surplus-honey portion, and the latter may be removed or taken from the hive from time to time, as occasion may require.

I would remark that the bar C of the trestle A may have its side or surface, which is directly above the alighting-board $d$, of rather greater inclination than the latter, in order to facilitate the entrance of the bees into the frames. (See Fig. 2.)

I do not confine myself to the precise form of the frames $f$, end pieces, D, and trestle A, as herein shown and described, for that may be varied materially and the same end attained. Neither do I confine myself to the size or dimensions of the frames, for that also may vary according to circumstances.

N, Fig. 4, represents a cylinder of wire cloth, which is fitted within a wooden frame, O. Within this wire cylinder there is fitted a separate case or feed-box, $b^\times$, inclosing a sponge, P, which is saturated with honey or other food suitable for the queen, and in the vacant space adjoining the feed-box and saturated sponge the queen is placed. By means of this cage queens may be sent by mail, express, or otherwise to distant localities, and the queens also preserved while being introduced into a hive having no queen.

I would remark that holes $a^{\times\times}$ may be made in the end pieces so as to admit by punching holes through the combs of winter-passages for the bees.

Having thus described my invention, what I claim as new, and desire to secure by Letters Patent, is—

1. The employment or use of a series of frames, $f$, placed upon a suitable trestle or support, A, and secured in proper contact with each other by means of a clamping device formed of the longitudinal bars C C, cross-bars E, springs I, bars H, and with or without the wedges J, all arranged and combined substantially as and for the purpose herein set forth.

2. The roof or cover K, applied to the frames $f$, and secured thereto and to the trestle A by means of the hooks $l$, formed at the ends of rods L, provided with springs M, substantially as set forth.

3. The trestle A, constructed substantially as shown, and provided with an alighting-board, $d$, when used in connection with the hive formed of the frames $f$, clamped together, substantially as herein described.

A. T. WRIGHT.

Witnesses:
I. M. LOUGHRIDGE,
F. T. WRIGHT.